United States Patent
Johnson et al.

(10) Patent No.: US 9,558,455 B2
(45) Date of Patent: Jan. 31, 2017

(54) TOUCH CLASSIFICATION

(71) Applicant: Microsoft Corporation, Redmond, WA (US)

(72) Inventors: Dan Johnson, Milliken, CO (US); Pablo Sala, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 14/329,052

(22) Filed: Jul. 11, 2014

(65) Prior Publication Data
US 2016/0012348 A1 Jan. 14, 2016

(51) Int. Cl.
*G06F 15/18* (2006.01)
*G06N 5/02* (2006.01)
*G06N 99/00* (2010.01)
*G06F 3/041* (2006.01)
*G06F 3/044* (2006.01)

(52) U.S. Cl.
CPC ........... *G06N 99/005* (2013.01); *G06F 3/0416* (2013.01); *G06N 5/027* (2013.01); *G06F 3/044* (2013.01)

(58) Field of Classification Search
USPC ......................................................... 706/12
See application file for complete search history.

(56) References Cited

U.S. PATENT DOCUMENTS 8,103,109 B2 1/2012 Winn et al.
8,902,170 B2* 12/2014 Pasquero .............. G06F 3/0236 345/169
8,973,211 B2* 3/2015 Rote ..................... G08B 29/126 15/345
9,244,545 B2* 1/2016 Hinckley ................ G06F 3/038
9,280,700 B2* 3/2016 Kim ..................... G06F 3/04883
(Continued)

FOREIGN PATENT DOCUMENTS

EP 2662756 A1 11/2013
GB 2481714 A 1/2012
(Continued)

OTHER PUBLICATIONS

Recognition, segmentation and retrieval of gang graffiti images on a mobile device Albert Parra; Bin Zhao; Joonsoo Kim; Edward J. Delp Technologies for Homeland Security (HST), 2013 IEEE International Conference on Year: 2013 pp. 178-183, DOI: 10.1109/THS.2013.6698996 IEEE Conference Publications.*

(Continued)

*Primary Examiner* — Michael B Holmes
(74) *Attorney, Agent, or Firm* — Judy Yee; Micky Minhas

(57) ABSTRACT

A method for touch classification includes obtaining frame data representative of a plurality of frames captured by a touch-sensitive device, analyzing the frame data to define a respective blob in each frame of the plurality of frames, the blobs being indicative of a touch event, computing a plurality of feature sets for the touch event, each feature set specifying properties of the respective blob in each frame of the plurality of frames, and determining a type of the touch event via machine learning classification configured to provide multiple non-bimodal classification scores based on the plurality of feature sets for the plurality of frames, each non-bimodal classification score being indicative of an ambiguity level in the machine learning classification.

29 Claims, 4 Drawing Sheets

(56) References Cited

U.S. PATENT DOCUMENTS

| | | | |
|---|---|---|---|
| 9,329,727 B2* | 5/2016 | Wang | G06F 3/0421 |
| 9,430,095 B2* | 8/2016 | Pradeep et al. | G06F 3/0425 |
| 2010/0127995 A1 | 5/2010 | Rigazio et al. | |
| 2011/0310038 A1 | 12/2011 | Park et al. | |
| 2012/0007821 A1 | 1/2012 | Zaliva | |
| 2012/0105361 A1 | 5/2012 | Kremin et al. | |
| 2012/0262407 A1 | 10/2012 | Hinckley et al. | |
| 2013/0106761 A1 | 5/2013 | Shahparnia et al. | |
| 2013/0176270 A1 | 7/2013 | Cattivelli et al. | |
| 2013/0201113 A1 | 8/2013 | Hinckley et al. | |
| 2013/0241890 A1 | 9/2013 | Sharma | |
| 2013/0300696 A1 | 11/2013 | Haran et al. | |
| 2014/0104225 A1 | 4/2014 | Davidson et al. | |
| 2014/0111462 A1 | 4/2014 | Townsend et al. | |

FOREIGN PATENT DOCUMENTS

| | | |
|---|---|---|
| WO | 2013126005 A2 | 8/2013 |
| WO | 2013166513 A2 | 11/2013 |

OTHER PUBLICATIONS

A study of touching behavior for authentication in touch screen smart devices Ala Abdulhakim Alariki; Azizah Bt Abdul Manaf; S. Khan 2016 International Conference on Intelligent Systems Engineering (ICISE) Year: 2016 pp. 216-221, DOI: 10.1109/INTELSE.2016.7475123 IEEE Conference Publications.*

A Novel Touchscreen-Based Authentication Scheme Using Static and Dynamic Hand Biometrics Mengyu Qiao; Suiyuan Zhang; Andrew H. Sung; Qingzhong Liu Computer Software and Applications Conference (COMPSAC), 2015 IEEE 39th Annual Year: vol. 2 pp. 494-503, DOI: 10.1109/COMPSAC.2015.133 IEEE Conference Publications.*

An Evaluation of One-Class and Two-Class Classification Algorithms for Keystroke Dynamics Authentication on Mobile Devices Margit Antal; László Zsolt Szabó 2015 20th International Conference on Control Systems and Computer Science Year: 2015 pp. 343-350, DOI: 10.1109/CSCS.2015.16 IEEE Conference Publications.*

Schwarz, et al., "Probabilistic Palm Rejection Using Spatiotemporal Touch Features and Iterative Classification", In Proceedings of Conference on Human Factors in Computing Systems, Apr. 26, 2014, pp. 2009-2012.

"International Search Report & Written Opinion Issued in PCT Application No. PCT/US2015/039282", Mailed Date: Sep. 28, 2015, 11 Pages.

* cited by examiner

TOUCH CLASSIFICATION

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
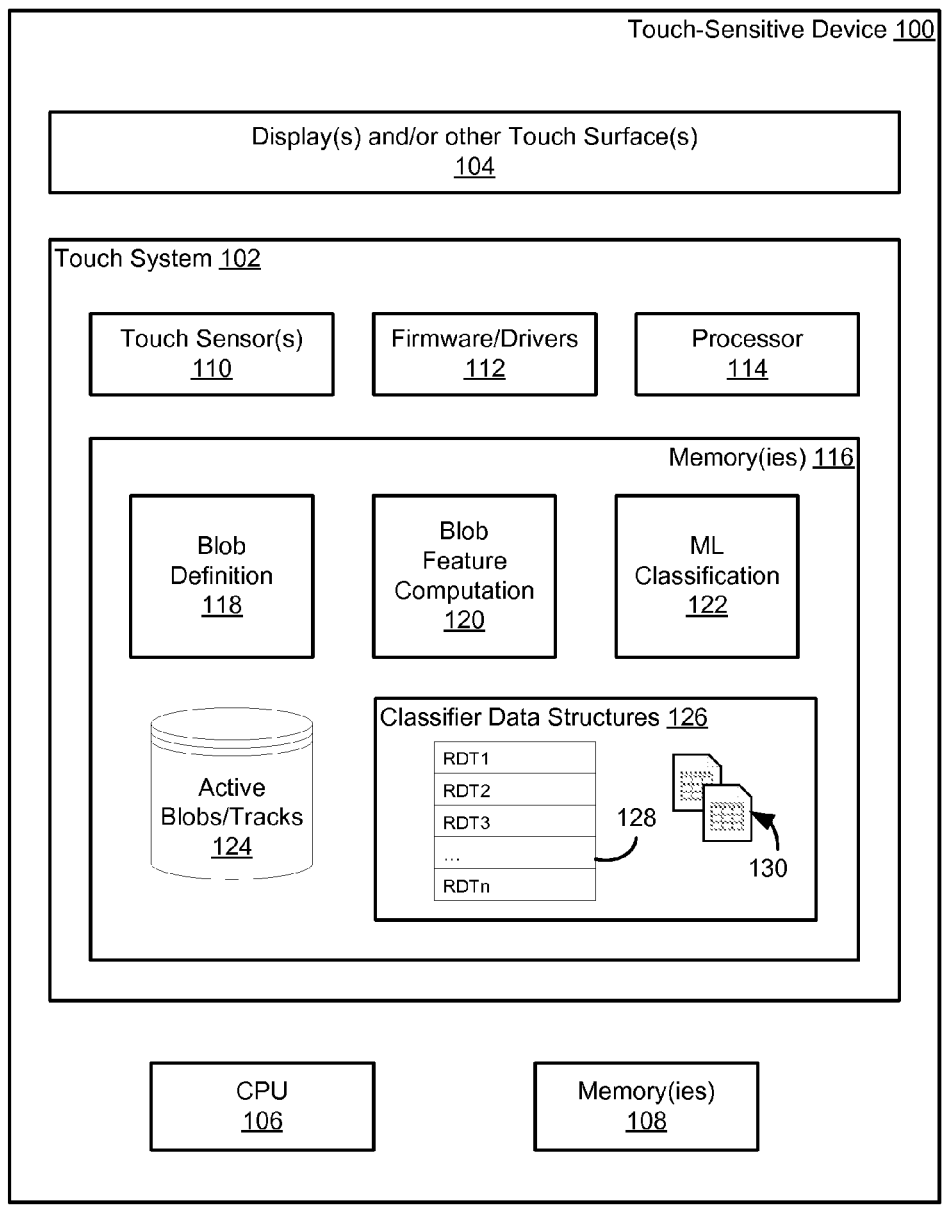
FIG. 1 is a block diagram of a system configured for touch classification in accordance with one example.

While the disclosed systems and methods are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Methods, systems, and computer program products are provided for classification of touch events on a touch-sensitive surface of a computing device. Machine learning classifiers are used to differentiate between intentional and unintentional touches. Unintentional touch events may arise from a user palm inadvertently or otherwise contacting the touch-sensitive surface. Other unintended touches may include a thumb or other portion of a hand on a bezel of a handheld device. The differentiation may allow such unintentional touch events to be rejected or ignored by the computing device. The rejection of unintentional touch events, coupled with proper recognition of intentional touch events, such as deliberate finger or stylus (or pen) touches, may provide an improved user experience with the computing device. In some cases, the classification techniques may also differentiate between different types of intentional touches, e.g., between finger and pen touch events. The differentiation may also include generating data indicative of a confidence or ambiguity level of the classification.

The classification techniques may address challenges presented by touch systems configured for stylus or pen touches. For instance, in the course of applying a mark on the touch-sensitive surface with a stylus or other pen instrument, the user may inadvertently rest his or her palm (or other portion of the hand or wrist) on the surface. The computing device may then incorrectly interpret this inadvertent palm contact as legitimate input activity, thereby causing potentially unwanted behavior by the computing device. Other unintentional touches may involve a user accidentally brushing or bumping a hand (or a pen or stylus device held in that same hand) against other parts of the surface. Yet another stylus-related challenge that may be addressed by the classification techniques involves correctly classifying the fingers not holding the stylus, such fingers often contacting the screen. Making matters more difficult, when a palm touches down near the edge of the screen, only a small portion of the palm may be detected by a touch-sensitive surface. The classification techniques may classify the palm correctly despite the reduced area of the palm in contract with the touch-sensitive surface.

The classification techniques may provide low computational complexity processes that reliably differentiate between intentional and unintentional touches in real time. The techniques may achieve low error rates without introducing unsuitable delays in user interface responsiveness. False positives (inputting unintentional touches) and false negatives (missed intentional touches) are avoided via the configuration of the machine learning classifiers and/or other aspects of the techniques. The machine learning classifiers may be trained via sensor imagery (or frame data) collected for each type of touch (e.g., from a multitude of people). The classification techniques thus do not necessarily rely on simple algorithms in the interest of minimizing latency in user interface processing. The machine learning classification provides reliable classification in real time, i.e., without introducing latency effects.

The improvements in accuracy may be realized in computing devices having different amounts of memory and other computing resources available. Different machine learning classifiers may be used to accommodate the different resource levels. For example, in some cases, the machine learning classifiers are configured as random decision forest (RDF) classifiers configured to provide conditional probability distributions. The RDF classifiers may involve storage of RDF tree data structures on the order of tens of kilobytes of memory. The RDF implementations may thus be useful in cases in which the touch classification occurs at a software level, such as the operating system level, with a general-purpose processor (e.g., central processing unit or graphical processing unit).

The classification techniques may also be implemented in computing environments in which memory and other computing resources are more constrained. In some cases, the machine learning classification is provided via decision-tree classifiers implemented as one or more look-up tables. The smaller classification data structures of the look-up tables are useful when the classification is implemented by microcontrollers and other resource-constrained hardware. The classification techniques may thus be implemented on a wide range of computing platforms. Although described below in connection with RDF and lookup table examples, the classification techniques are not limited to any particular type of machine learning classifier. For instance, neural networks, fuzzy logic, support vector machine, and logistic regression classifiers may be used.

The classification techniques are configured to aggregate touch information over multiple frames of a touch event to improve the accuracy of the classification. The aggregation avoids problems that may arise in attempts to classify a touch event based on only a single image or frame. For example, a palm may appear similar to an intentional touch when the palm is first coming in contact with the surface, or when the palm has almost been removed from the surface. At either point, only a small portion of the palm may be detected. In some cases, the aggregation involves aggregating classification scores over the multiple frames. In other cases, the aggregation involves aggregating properties or features of the touch event over multiple frames. In still other cases, the classification techniques may use a combination of both types of aggregation. The aggregation may also help avoid false positives arising from other situations, such as when the normally large area of a palm touch tends to disappear due to a user being in a state of electrical floating (e.g., the user does not have a good high frequency connection to ground).

The machine learning classifiers are configured to provide multiple non-bimodal classification scores. Each non-bimodal classification score is indicative of an ambiguity or confidence level in the machine learning classification. The nature of the classification scores may vary in accordance with, for instance, the type of classifier used. For example, each classification score may be non-bimodal in the sense that the classification score is a probability value (e.g., a floating point or other non-integer number falling between 0 and 1). Multiple probability values may be provided (e.g., one for each type of touch event). Other types of classification scores may instead use integer numbers. For example, the classification score may be a score rating falling in a range of possible scores (e.g., −9 to +9). In such cases, multiple non-bimodal scores may be combined (e.g., summed) to determine a final, composite rating. For example, the non-bimodal scores from multiple lookup tables may be combined for each frame, which then may be aggregated across all of the frames associated with the touch event. Other types of non-bimodal scores may be used. For example, the probability and rating types of classification scores may be integrated to varying extents to provide a hybrid classification approach.

The term "finger touch" is used herein to refer to any deliberate or intentional touch event involving a user's hand or other body part. For example, a finger touch may involve the side of the thumb contacting the touch-sensitive surface, which may occur, for instance, during a two-finger zooming gesture. The touch may be direct or indirect. For example, the touch may be made with a gloved hand or otherwise clothed body part.

The term "pen touch" is used to refer to a variety of different intentional touches involving a pen, stylus, or other object held by the user to interact with the touch-sensitive surface. The computing devices may be configured for use with various distinct or tagged physical objects, including pucks, specialized tools such as brushes or airbrushes, mobile devices, toys, and other physical icons or tangible objects.

The term "touch" is used to refer to any interaction with a touch-sensitive surface detected by an input sensor associated with the touch-sensitive surface. A touch may not include or involve direct physical contact. The interaction may be indirect. For instance, the touch-sensitive surface may be configured with proximity sensors. The interaction may be detected via various physical properties, such as an electromagnetic field. The nature and/or source of the touch may thus vary, including, for instance, finger or hand contacts, pen or stylus contacts, hover-based inputs, tagged objects, and any other object placed in contact with or otherwise in proximity to the input surface. The classification techniques may accordingly be useful in connection with gesture- and hover-type touch events involving projected capacitance, optical, and/or other sensing technologies.

The terms "palm" and "palm touch" are used to refer to contact or other touch surface interaction involving any one or more body parts not intended by the user to be interpreted as a touch or other interaction with the touch-sensitive surface. The parts of the body may include other parts of a hand in addition to the palm, such as the knuckles of the hand, the side of a finger, the wrist or forearm, or other body part.

The classification techniques may be useful with a variety of handheld and other computing devices. The touch-sensitive surface and, thus, the nature of the interaction with the touch-sensitive surface, may accordingly vary. Intentional touches are thus not limited to involving fingertips or fingers of the user. The classification techniques are compatible and useful in connection with any touch-sensitive computing device having one or more touch-sensitive surfaces or regions (e.g., touch screen, touch sensitive bezel or case, sensors for detection of hover-type inputs, optical touch sensors, etc.). Examples of touch-based computing devices include, but are not limited to, touch-sensitive display devices connected to a computing device, touch-sensitive phone devices, touch-sensitive media players, touch-sensitive e-reader, notebook, netbook, booklet (dual-screen), or tablet type computers, or any other device having one or more touch-sensitive surfaces. The size and form factor of the touch-sensitive computing device may thus vary. For example, the size of the touch-sensitive surface may range from the display of a handheld or wearable computing device to a wall-mounted display or other large format display screen. However, the touch-sensitive surface may or may not be associated with, or include, a display or touchscreen. For example, the touch-sensitive surface may be provided as a track pad or may be a virtual surface implemented as a plane in space on which touch input is detected, for example, as may be implemented using Microsoft Corporation's Kinect device.

The classification techniques are described in connection with capacitive touch systems. Notwithstanding the references herein to capacitive sensing, the touch classification techniques described herein are not limited to any particular type of touch sensor. The touch-sensitive surface may alternatively use resistive, acoustic, optical, and/or other types of sensors. Touch-sensitive surfaces may thus alternatively detect changes in pressure, light, displacement, heat, resistance and/or other physical parameters. The manner in which the touch-sensitive surface detects an input device, such as a stylus or pen, may vary. For example, the pen may be passive and/or active. An active pen may emit or retransmit a signal detected by the touch-sensitive surface. A passive pen may include a magnet or other object or material in, e.g., a stylus tip, that interferes with an electromagnetic field or other feature of the touch-sensitive surface for purposes of proximity detection. Other aspects of the nature of the touch sensor technology may vary.

FIG. 1 depicts a touch-sensitive device 100 configured to implement touch classification. The device 100 includes a touch system 102 and a touch-sensitive surface 104. The touch-sensitive surface 104 may be a touchscreen or other touch-sensitive display. Any number of touch-sensitive surfaces 104 may be included. In this example, the device 100 also includes a processor 106 and one or more memories 108. The touch system 102 may serve as an interface or other intermediary between the touch-sensitive surface 104 and an operating environment supported by the processor 106 and the memories 108. The processor 106 may be a general-purpose processor, such as a central processing unit (CPU), a graphic processing unit (GPU), or any other dedicated processor or processing unit. Any number of such processors or processing units may be included.

The touch system 102 may be communicatively coupled to the processor 106 and/or the memories 108 to provide data indicative of a touch event occurring at the touch-sensitive surface 104. The touch event data may specify a location and type of the touch event. The data may also be representative of an ambiguity level in the assignment of the type. Additional, fewer, or alternative information may be provided by the touch system 102 in connection with the event type. For example, the touch event type may be provided with data indicative of a touch event identification code. The location and/or other information for the touch event may be provided separately by the touch system 102.

In the example of FIG. 1, the touch system 102 includes one or more touch sensors 110, firmware and/or drivers 112, a processor 114, and one or more memories 116. The processor 114 is communicatively coupled to each memory 116 and/or the firmware/drivers 112. The processor 114 is configured to obtain frame data captured via the touch-sensitive surface 104. The frame data is representative of a plurality of frames captured via the touch-sensitive surface 104. The frame data for each frame may include a matrix of values, or pixels, that together form an image of the extent to which touch events are occurring at the surface 104. The value of each pixel indicates the amount of touch that the sensor 110 has detected at a particular location on the surface 104. The frame data may include the raw output data of the touch sensor 110 and/or include a processed representation of the raw output data.

The manner in which the frame data is obtained by the processor 114 may vary. For example, the frame data may be received via the firmware/drivers 112 and/or be obtained by accessing the memory 116.

The frame data may be alternatively or additionally obtained by the processor 106. In some cases, the processor 106 obtains the frame data for purposes of implementing a touch type determination. In such cases, the processor 114 may be directed to controlling the sensor 110 and/or configured to implement one or more pre-processing or other tasks in preparation for the determination. The processing of the frame data and other aspects of the touch classification techniques may be implemented by any combination of the processor 106 and the processor 114. In other examples, the device 100 includes a single processor (i.e., either the processor 106, the processor 114, or a different processor) for purposes of obtaining and processing the frame data.

The configuration and arrangement of the touch system hardware in the device 100 may vary. For example, each touch sensor 110 may alternatively be configured as a component of the touch-sensitive surface 104. The driver and other information provided via the firmware 112 may alternatively be stored in the memories 116.

The processor 114 is configured to execute a number of instruction sets stored in the memory 116 and/or the memory 108. The instruction sets may be arranged as respective software modules. The modules or other instruction sets may be integrated to any desired extent. The instruction sets include blob definition instructions 118, feature computation instructions 120, and machine learning classification instructions 122. The blob definition instructions 118 may be directed to defining blobs, or connected components, for a touch event across multiple frames of the frame data. A respective blob may be defined in each frame in which the touch event occurs. The feature computation instructions 120 may be directed to computing properties or features for the blobs. Each feature may characterize an aspect of the blob that may help identify the type of touch event. The machine learning classification instructions 122 are directed to determine the type of touch event through machine learning classification based on the feature sets. The output of the classification includes multiple non-bimodal classification scores, which identify a level of ambiguity in the classification. To that end, feature set(s) may be applied to a machine learning classifier to generate the classification scores. Each instruction set is described in connection with multiple examples below. Additional instructions, modules, or instruction sets may be included. For instance, one or more instruction sets may be included for generating a touch type based on the output of a machine learning classifier and/or transmitting data indicative of the touch type to the processor 106 or other component of the device 100.

The processor 114 is configured to execute the blob definition instructions 118 to analyze the frame data to define a respective blob in each frame of the plurality of frames for the touch event. A given touch event may span any number of frames. The definition of the blobs over the multiple frames establishes the input data to be processed in classifying the touch event.

The blob definition instructions 118 may cause the processor 114 to perform a number of preprocessing acts to prepare the frame data for analysis. For example, the frame data (e.g., the raw frame data) may be upsampled and/or thresholded prior to the analysis (e.g., blob definition analysis). Upsampling the frame data may include 4× or other upsampling rates via bi-linear interpolation. Other upsampling procedures may be used, such as bi-cubic, convolution, and nearest neighbor techniques. Other procedures may be used. In some cases, the frame data is analyzed without upsampling, without thresholding, or without upsampling and without thresholding. For example, the frame data is not upsampled in some cases in which lookup table classifiers are used.

Thresholding the frame data may be directed to eliminating small fluctuations in the frame data due to noise. For example, a predetermined intensity threshold is used to reset all pixels in the frame data having an intensity value below the threshold to a zero value. Additional or alternative filtering techniques may be used to remove noise. In cases in which the frame data is upsampled, the thresholding is implemented after the upsampling.

The frame data threshold may differ from other thresholds used by the touch system 102. For example, the frame data threshold may be lower than a threshold used by the touch system 102 for detecting touch events. A lower threshold may be useful in detecting palm and/or other touch events before and after actual contact with the surface 104. For example, detecting a palm immediately before contact (e.g., as the palm approaches the surface 104) may provide one or more additional frames of data for purposes of differentiating the palm touch from intended touches. In some cases, the threshold may be established as a configurable or predetermined percentage of the touch system threshold, which may be a variable threshold depending on the level of noise detected by the touch system 102.

The thresholding may alternatively or additionally be configured and directed to generate a binary representation of the frame data on a pixel-by-pixel basis. Each pixel is either "on" or "off" based on the intensity value of the pixel relative to the threshold. The binary representation of the frame data may be used to simplify the process for defining blobs in the frame data.

Blobs are defined in the frame data by analyzing the frame data to determine which "on" pixels (e.g., pixels having a non-zero intensity) are adjacent to other "on" pixels. Such adjacent pixels are considered connected to one another. A group of connected pixels is then considered to be a connected component, or blob, in the frame image. Each frame may have a number of blobs, each of which may be separately classified. The connected component analysis is performed across the entire frame dataset to detect all blobs in the frame. The blob definition instructions 118 may direct the processor 114 to assign an identifier to each blob for purposes of tracking and directing future processing with respect thereto.

In many cases, each blob corresponds with a discrete object touching the surface 104. However, there are cases in which two or more blobs are induced by the same object. For example, the touch contact of a palm is sometimes divided into two or more disconnected blobs. In other cases, a single touch blob is the result of multiple objects that are too close to each other, e.g., fingertips of fingers that are touching each other. The connected component analysis of the frame data may thus include further processing of the frame data to address these potential complications. For example, the blob definition instructions 118 may cause the processor 114 to further analyze the frame data to determine whether blob splitting and/or blob merging is warranted.

In a blob splitting analysis, each blob may be analyzed to determine if the blob is the result of the contact of multiple fingertips belonging to close fingers. The determination may use a classifier. The blobs deemed to correspond to multiple fingers are split into separate sub-blobs for analysis. In one example, the coordinates of each fingertip touch are determined based on the position of the local maxima (e.g., pixels with an intensity value greater than or equal to all eight immediate neighbors) in the blob. A fingertip is assumed to be located at each intensity local maximum in the blob, and the blob is partitioned into sub-blobs by assigning each pixel in the original blob to the sub-blob associated with the fingertip whose location (e.g., local maximum) is closest to the pixel.

The decision as to whether a given blob is, in fact, generated from multiple fingertips may be realized using a classifier. In one example, the classifier is implemented via one or more decision trees. But a variety of different classifiers may be used. The classifier may or may not be machine learned. For example, the classifier may be handcrafted based on empirical or other data.

In one exemplary blob splitting procedure, a list of coordinates (which may be at sub-pixel accuracy) of all local maxima in the blob having an intensity above or equal to a given threshold is generated. The maxima in the list are sorted in one of the possible orders of their shortest traversal (i.e., the shortest path through all local maxima in the list). A threshold is found from training data as the minimum intensity value achieved by a local maximum corresponding to a fingertip.

The features employed by the classifier may be or include the area of the blob, the number of local maxima, the distance between consecutive local maxima in the sorted group (i.e., in the order of their shortest traversal), and the variation in intensity along the line connecting consecutive local maxima in the sorted group. The classifier may thus be configured to be responsive to the distance between the local maxima and the extent to which the intensity drops between the local maxima.

Once a blob has been deemed to correspond to multiple fingertips, the blob is split into separate blobs, each associated with a respective one of the local maxima. Each such blob is formed by, or includes, a subset of the pixels from the original blob. The pixels in the original blob are associated with the respective one of the new blobs having the closer (or closest) local maximum.

Blob splitting may be implemented in cases involving more complexity in the touch classification. For example, blob splitting may be implemented in cases in which random decision forest classifiers are used for touch classification. In other cases, blob splitting is not implemented, including some cases in which lookup table and other low resource classifiers are used for the touch classification. Blob splitting may nonetheless be implemented or not implemented in either of those cases.

In cases in which blob splitting is not implemented, the blob definition instructions 118 may direct the processor 114 to identify and store the local maxima within each blob. With each maximum identified, changes in each blob (e.g., the local maxima found within each blob) in subsequent frames may be tracked. For example, if the blob becomes two separate blobs when fingertips are spread apart, the local maxima may be used to support the separate classification of the two separate blobs. The locations of the maxima may additionally or alternatively be used to correlate the touch event with potential touches detected by other parts of the touch system 102. For instance, the firmware 112, the memory 116, and/or another memory may include instructions directed to detecting touch events without classification.

Blob merging may be implemented as an alternative or additional blob definition procedure. In blob merging, closely spaced blobs are merged together to form a single blob. Merging may be implemented to minimize the number of blobs that are later processed and classified. Merging may accordingly be implemented in lookup table and other low resource classification platforms. Merging may also be useful for merging close finger touches with a corresponding palm. The distance at which blobs are merged together may be configurable. In one example, the distance is two image pixels, which may correspond to approximately 9 mm in some touch systems.

In some cases, the blob definition instructions 118 also include instructions to direct the processor 114 to assign blobs to tracks. The term "track" is used to refer to a collection of blobs (and the underlying frame data) generated by a particular object over a series of consecutive frames (e.g., while the object is in contact with the surface 104). Track assignment and definition may be implemented after any blob splitting or merging. The definition of a track allows the movement and other changes that a blob undergoes across multiple frames to be tracked. By assigning blobs to a particular track, blobs in respective frames may be associated with one another as part of the same touch event. For example, a number of blobs in successive frames may be associated with one another as part of a touch event that involves a user fingertip moving across the surface 104 in a swipe gesture. Each new blob may be either assigned to a new track or an active track. An active track is a track that was already defined as of the previous frame.

In some cases, new blobs may be assigned to active tracks via bipartite matching or other analysis of the blobs in the respective frames. A variety of matching techniques may be used to associate a blob detected in the current frame with a blob in the previous frame. The cost function employed in bipartite matching may be based on the distance between each new blob's position and the expected position of the contact point of each track as estimated from the previous track's trajectory. The blobs presented by each successive frame determine whether a track is extended or removed.

A list of active tracks and their associated attributes is stored by the touch system 102. In the example of FIG. 1, the list is stored in a database 124, which, in turn, may be stored in one of the memories 116. Other storage locations and/or data structures may be used. Tracks that cannot be extended by a current blob are removed from the list of active tracks. A new active track is added to the list for each blob that could not be matched to or otherwise associated with any existing active track. The blob definition instructions 118 may be configured to associate blobs with tracks via track identifiers, such as a track ID number.

The blob definition instructions 118 may pass control to the blob feature computation instructions 120 when a track becomes mature. A track is considered to be mature when the track has been extended at least a predetermined number of frames. For example, the number of frames may be three frames.

The assignment of blobs to tracks may be useful when the features to be applied in the machine learning classification include features of the track. Track features may be applied in addition to the features of the individual blobs, as described below in connection with examples involving random decision forest (RDF) classifiers. Tracks may also be used in other cases, including those in which track features are not used in the classification. In still other cases, blobs are not assigned to tracks. For example, tracks may not be used in lookup table and other low resource classification techniques having a small feature set.

The processor 114 is configured to execute the feature computation instructions 120 to compute a plurality of feature sets for each touch event. Each feature set specifies properties of the respective blob in each frame of the plurality of frames. The properties may be computed as the blobs are defined or at a later point in time, such as when a track is deemed to mature. For example, the blob feature computation instructions 120 may be configured to cause the processor 114 to aggregate the feature set data before application thereof to a machine learning classifier in determining the type of the touch event. In other cases, the feature set data for a particular blob is applied to the machine learning classifier as the computation of further feature datasets is ongoing. For example, the application of the feature set data for a first frame may be applied to the classifier concurrently with the computation of the feature set data for a second frame. Such concurrent processing may be useful in cases in which the feature data is applied to the classifier separately for each frame.

The blob properties to be computed may vary. In one example involving a random decision forest (RDF) classifier, any combination of the following blob properties may be computed for each blob: (i) area; weighted centroid (e.g., $\Sigma_{(x,y)\in Blob}(x,y)*Intensity(x,y))$; (ii) minimum, maximum, and mean intensity; (iii) minimum, maximum, and mean intensity gradient magnitude; (iv) perimeter; (v) a roundness metric, such as the isoperimetric quotient (i.e., $4*PI*Area/Perimeter*2$); (vi) distance from the weighted centroid to closest image edge; (vii) average intensity of blob pixels on image edge (i.e., the pixel is along the first or last row or column in the image); (viii) width at image edge (i.e., number of blob pixels on image edge); (ix) the appearance of a 5×5 image patch (from the raw or thresholded frame data) centered at weighted centroid; and, (x) the appearance of a 17×17 image patch (from the raw or thresholded frame data) centered at weighted centroid. The appearance of the image patches may be quantified via analysis of the intensity values of the respective pixels in the patch. The size of the image patch features may vary. The image patches may also be centered or otherwise disposed relative to the blob at positions other than the weighted centroid.

Additional, fewer, or alternative properties may be computed for the RDF classifier and/or other types of machine learning classifiers. For example, in one example involving a lookup table classifier, the following features are computed for each blob: the height of the blob (e.g., maximum pixel intensity value in the blob); the area of the blob; and the texture of the blob. The texture feature may be indicative of the gradients in intensity values within the blob. For example, the texture may be computed as the sum of the absolute values of the differences between each pixel in the blob and its eight nearest neighbors divided by eight times the area of the blob. Blobs generated by palms tend to be flatter, or have smoother interiors, and thus have lower textures than blobs generated by multiple closely spaced finger touches. The computation of fewer features may reduce the code space and processing time of the computation instructions 120. Fewer features may also reduce the amount of memory involved in storing the results of the computations for each blob.

In some cases involving tracks, the blob feature computation instructions 120 may also cause the processor 114 to compute one or more features for the track of a touch event. A track feature set may be computed for the track in addition to the feature sets for each blob within the track, examples of which are listed above. The track feature set may be computed upon a track reaching maturity.

The track feature set may include features that are cumulative of one or more of the above-referenced blob properties. In one example involving a random decision forest (RDF) classifier, minimum, maximum, and mean values of the following blob properties over a predetermined number of frames of the track are computed: (i) area; (ii) change in area between consecutive frames; (iii) change in position between consecutive frames; (iv) isoperimetric quotient; (v) intensity; (vi) intensity gradient magnitude; (vii) distance to closest image edge; (viii) average intensity of pixels on image edge; and (ix) width at image edge.

The track feature set may additionally or alternatively include features directed to the properties of the individual blobs for the first F frames of the track. Thus, in some cases, the computation of the blob properties at each frame may be one way of gathering data for a track. For example, the following features may be computed for each individual blob: (i) area; (ii) change in area between consecutive frames; (iii) change in position between consecutive frames; (iv) isoperimetric quotient or other roundness metric; (v) minimum, maximum, and mean intensity; (vi) minimum, maximum, and mean intensity gradient magnitude; (vii) distance to closest image (or frame) edge; (viii) average intensity of pixels on image edge; (ix) width at image edge; (x) intensity of pixels in a 5×5 image patch (from the raw or thresholded frame data) centered at weighted centroid; (xi) intensity of pixels in a 17×17 image patch (from the raw or thresholded frame data) centered at weighted centroid; (xii) intensity differences between pairs of pixels from the 5×5 image patch; (xiii) intensity differences between pairs of pixels from the 17×17 image patch; (xiv) minimum intensity difference between two concentric rings in the 17×17 patch, e.g., $\min\{I(p): |p-c\|=r\_1\}-\max\{I(p): \|p-c\|=r\_2\}$, where $r\_1 < r\_2$ where I is the image intensity matrix and c is the weighted centroid. Additional, fewer, or alternative features may be computed in connection with the track.

The processor 114 is configured to execute the machine learning classification instructions 122 to determine a type or nature of the touch event. The type is determined via machine learning classification. The classification is configured to provide multiple non-bimodal classification scores based on the plurality of feature sets for the plurality of frames. Each non-bimodal classification score is indicative of an ambiguity or confidence level in the machine learning classification. For example, each classification score may be a probability that the touch event is of a certain type. In other examples, the classification scores are individual ratings along a range or scale indicative of whether the touch event is of a certain type. The individual ratings may be aggregated in some cases to determine a cumulative rating. The cumulative rating or other classification scores may be compared with thresholds as described below to determine the touch event type.

Once the touch event type is determined, the classification instructions 122 may also be configured to cause the processor 114 to provide data indicative of the type to the device 100. In the example of FIG. 1, the processor 114 may provide the type data to the processor 106. The type data may be stored or provided to any component of the host device. The type data may be provided along with other data indicative of the touch event. In some cases, the other data includes a track ID and the coordinates of the touch event in the current (e.g., last) frame. Other data may be provided with the touch type in other cases. For example, the touch type may be provided with the touch event coordinates.

The machine learning classification instructions 122 may be invoked once or iteratively per classification. The manner in which the instructions 122 are invoked may depend on when the feature set data is computed. For touch events for which track data is computed, the processor 114 may apply all of the feature set data to a machine learning classifier collectively in a single invocation for the track. In some other cases, the classification instructions 122 are implemented iteratively as the feature set data is computed for each frame. For example, the feature set data for each blob is applied to the machine learning classifier separately. Further feature set data may then be computed while the previously computed feature set data is applied to the machine learning classifier.

The machine learning classification instructions 122 may cause the processor 114 to access one or more classifier data structures 126. The classifier data structures 126 may be stored in the memory 116 and/or another memory. The format and other characteristics of the classifier data structures 126 may vary in accordance with the type of machine learning classifier to be used. Two examples of classification data structures are shown in FIG. 1 for ease in illustration and description, as the device 100 is typically only configured with a single classifier. The two exemplary data structures are a random decision forest (RDF) data structure 128 and a lookup table data structure 130. While the feature set data is typically applied to only one data structure, more than one classifier may be used in some cases. For example, the outputs of multiple classifiers may be compared or processed to determine a final classification.

RDF classification is one of a number of discriminative classification techniques that may be used by the classification instructions 122. A discriminative classifier generates or returns multiple non-bimodal classification scores in the form of a discrete probability distribution over a set of classes for a given array of inputs. In this example, the classes correspond with the possible types of touch events, e.g., an intended fingertip touch, a capacitive stylus or other pen touch, and an unintended touch, such as a palm. For example, an exemplary output is {0.45, 0.32, 0.23}, or a 45% chance that the touch event is an intended fingertip touch, a 32% chance that the touch event is a pen touch, and a 23% chance that the touch event is an unintended touch event (e.g., a palm touch). Each probability score is thus representative of a probability that the touch event is of a particular type. Additional, fewer, or alternative classes may be used in other cases. For example, only two classes may be used in cases differentiating between intended and unintended touch events.

The discriminative classifier may be configured to accept the plurality of feature datasets as inputs. The inputs to the discriminative classifier may thus be the blob and track feature data computed for a touch track (e.g., the first few frames or another predetermined number of frames) in accordance with the computation instructions 120. In track examples, the feature set for each track is applied to the classifier at the time that the track reaches maturity. The classifier thus provides the probability distribution output for each mature track.

The RDF data structure 128 includes a collection of randomized decision trees RDT1, RDT2, RDT3, . . . RDTn, where n may be any number. In one example, the data structure includes 20 trees, each tree having a maximum decision height of 11. In random decision forest procedures, the same input array is applied to each tree. The output of the RDF for a given input is computed by averaging the output of each of the trees for given input. The number and height of the trees may vary.

Each RDT is a binary decision tree in which each internal (i.e., non-leaf) node has an associated "split" binary function. When the split binary function is applied to an input, the function returns a decision if the input is to be routed to the node's right or left child in the next level of nodes in the tree. The classification process in an RDT for a given input X starts by processing X in the tree's root node by applying the root's associated split function and recursively continue the process of the input on the child node corresponding to the split function's result. Eventually the process reaches a leaf node, at which a discrete probability distribution is returned over the set C of classes as the process output.

The split functions within the trees may be implemented as an inequality comparison between the value of a feature and a threshold value, i.e., $f<T$, where f is the value of a particular feature and T is a threshold value. The particular feature and threshold to be used at each node is learned during the training process.

During training, at each node, the best features are chosen from a sampling of the space of each type of features. For the feature space, as many samples as the square root of the space size were sampled.

In the example of FIG. 1, only the single RDF structure 128 is shown and used to provide all three classification scores (e.g., fingertip, pen, palm). But in some cases, multiple RDF classifiers may be used to provide the classification scores. For instance, two RDF classifiers, each with a respective set of trees, may be used to provide the three classification scores. In one example, one RDF classifier may be used to differentiate between intended and unintended touches. The other RDF classifier is then used to differentiate between pen and fingertip touches in connection with intended touches.

The output of the RDF classification may be adjusted in some cases. For example, the adjustments may address situations involving a frame with multiple newly matured tracks. After the touch type of all of the newly matured tracks in a frame are classified, the classification instructions 122 may cause the processor 114 to adjust the type of tracks near a track classified as an unintended (e.g., palm) touch event. If the current location of the blob of a first track falls within a threshold of a blob of a second track that was classified as an unintended touch, the first track is classified as an unintended touch as well. Such adjustments may be useful because these nearby blobs are often produced by the unintended touch of a knuckle or a finger from the hand having a palm resting on the surface 104.

Additional or alternative machine learning classifiers may be used by the classification instructions 122. For instance, other types of discriminative classification techniques may be used. In some examples, the machine learning classifier is a lookup table classifier. Lookup table-based classification may be useful in connection with devices having limited processing and/or memory resources, such as when the processor 114 is a microcontroller. Use of lookup tables may dramatically reduce the memory footprint and processing time for the classification.

In the example shown in FIG. 1, the lookup table data structure 130 includes a pair of lookup tables to differentiate between intentional and unintentional touch events. Feature set data is applied to each lookup table. Each table then provides a respective individual non-bimodal classification score or rating, as described below. A first look-up table may be configured to provide a first rating as to whether the touch event is an intended touch. A second look-up table may be configured to provide a second rating as to whether the touch event is an unintended touch. Each of these individual ratings or scores for the respective frame may then be combined to generate a frame classification rating score for the respective frame. Additional lookup tables may be provided to, for instance, further differentiate the touch event type. In other cases, the data structure 130 includes only a single lookup table.

In this lookup table-based classification example, the feature set data is applied to the classifier on a frame-by-frame basis. For example, the feature set data for a respective frame is applied to each lookup table in the data structure 130. Each table then provides a respective individual non-bimodal classification score or rating for that frame, as described below. The frame classification rating scores for the frames during which the touch event is present are then aggregated (e.g., summed) to determine a cumulative, multi-frame classification score for the touch event.

The manner in which the classification ratings or scores are combined and then aggregated across frames is described below in connection with an example in which the individual ratings are combined by subtracting one rating from another. The individual ratings may be combined in a wide variety of other ways. For example, the individual ratings or scores may be configured such that the combination involves an addition operation, an averaging operation, and/or other operations. The aggregation of classification scores across frames may also be implemented in ways other than the summation operation described below. The classification instructions 122 may then cause the processor 114 to determine whether the cumulative, multi-frame classification score passes a threshold. In some examples, multiple classification thresholds are provided, one for each possible touch event type. If the threshold(s) is/are not exceeded, then the level of ambiguity may be deemed to be too high to reliably classify the touch event. At that point, the blob definition instruction 118 and the computation instructions 120 may be invoked again to provide feature set data for the next frame. The new feature set data may then be applied to the lookup table(s) again for further scoring, aggregation, and thresholding.

The lookup table classifier may be configured to use the features of a blob as indices to the lookup table(s). The features computed for each blob may be height, size, and texture, as described above. Additional, fewer, or alternative features may be included. In one example, each entry in the table is a two-bit rating indicating the likelihood that the blob is of a particular touch event type, i.e., the table's associated class. A rating of three indicates that the blob is very likely a member of the class. A rating of two indicates that the blob is somewhat likely a member of the class. A rating of one indicates that the blob is possibly a member of the class, but not highly likely. A rating of zero indicates that the blob is very unlikely to be part of the class.

In this example, individual blob rating scores are obtained from two classification tables, one for intended touches (e.g., finger or pen) and another for unintended touches (e.g., palms). Each blob is looked up in both tables by applying the feature set data to both tables. A frame-specific blob classification rating (or "blob classification rating") may then be computed for the blob by combining the individual ratings from the respective tables by subtracting one from the other as follows:

Blob Classification Rating=fingerTable rating−palmTable rating

As a result, the blob classification rating ranges from −3 to +3, where positive values indicate that the blob is more likely an intended touch, and where negative values indicate that the blob is more likely an unintended touch. The absolute value of the rating is an indication of the certainty of the classification or ambiguity level in the rating. A blob classification rating is computed for each blob in a touch image.

The blob classification ratings for a particular touch event may then be accumulated or aggregated across multiple frames to generate a cumulative blob rating for the touch event. For example, if the blob has blob classification ratings of +2, +1, and +2 in the first three frames, the cumulative blob rating is +5, i.e., the summation of the three blob classification ratings.

The cumulative blob rating is then used to determine the touch event type. The cumulative rating may be compared with one or more thresholds. In one example, two thresholds are used to support differentiation into one of three possible classifications. Negative touch ratings less than or equal to a palm threshold are classified as palm touch events. Positive touch ratings greater than or equal to a finger threshold are classified as finger/pen touch events. All other touch ratings are classified as unknown. The palm and finger thresholds are configurable, but exemplary settings are −9 for the palm threshold and +6 for the finger threshold.

The cumulative blob rating may also be used to determine whether processing further frame data is warranted. If the cumulative rating falls within the unknown range, then further frame data may be processed to incorporate another blob classification rating into the aggregation. For example, the first image (or frame) of an approaching palm is assigned a blob classification rating of +1. Because this is the first image for this palm, the cumulative rating is also +1. In the next image, the blob classification rating is assigned +1 again. The cumulative rating is now +2. In the next image, more of the palm is touching down so the blob classification rating changes to −2 and the cumulative rating is now 0. The next three images are then assigned blob classification ratings of −3, bringing the cumulative rating to −9, at which time the touch is classified as a palm touch event. All of the previous touches would have been classified as unknown. Even though the first two touch images looked slightly more like fingers than palms, the classifier still reaches the correct final classification without an erroneous false positive classification.

The classification instructions 122 may be configured to cause the processor 114 to associate blobs with touch events. In some cases, touch events may be initially identified by the firmware 112 or other component of the touch system 102.

For each potential touch event, a bounding box of the touch event may be defined and compared to all of the maxima found in the current touch image (or frame data) to identify which blob is associated with the touch event. Most touch images will have only a single blob within the bounding box and, thus, corresponding with a touch event. In the unlikely event that multiple blobs have maxima that lie within the bounding box, the cumulative rating of the touch event may be computed as the average of the cumulative ratings for such overlapping blobs.

The classification instructions 122 may also incorporate a number of adjustments into the composite rating to address one or more unique circumstances. Each adjustment is incorporated based on whether a rule or condition is satisfied or present. The adjustments may supplement the classification capacity of the lookup tables without adding significant complexity to the procedure.

Edge Effect Rule.

Palms that are mostly off the edges of the touch screen may have the tendency to look like intended touches due to their small size. To improve performance in these circumstances, the number of edge pixels in each blob may be tracked. The classification instructions 122 may be determined if the number of edge pixels exceeds a threshold. If the number of edge pixels exceeds the threshold, the blob classification rating score is adjusted. In one example, the difference between the number of edge pixels and the threshold is subtracted from the blob classification rating score. This adjustment skews the rating of these blobs toward the palm rating threshold. Blobs due to a single intended touch tend to have a small number of edge pixels and thus are unaffected by the adjustment rule. Blobs due to a palm at the edge of the surface 104 are more likely to have a larger number of edge pixels and are accordingly skewed toward a palm classification to minimize false positives. While blobs due to multiple closely spaced fingers at the edge may also be skewed toward a palm rating by this rule, and result in a false negative, the rate of such false negative results may be acceptably low, insofar as gestures near the edge are usually single finger gestures.

Palm Proximity Adjustments.

Users that are writing with a stylus often rest their palm on the screen while gripping the stylus with 2 fingers and a thumb. The other two fingers of the hand are near the surface 104 and often contact the surface 104 during writing. This situation creates blobs that may appear to be intentional touches. To minimize false positives in these circumstances, the blob classification rating score may be adjusted by subtracting a quotient calculated by dividing a blob area of the blob by the threshold area. The adjustment may be made when a blob's area is above a threshold and the blob is near another blob that looks like a palm (e.g., a negative blob rating). This adjustment tends to skew finger touches that are very close to a palm towards a palm rating to minimize false positives. The adjustment may not affect the classification of stylus touches alone, even when they are also close to the palm, because the stylus touches have an area below the threshold.

Anti-Touch Adjustments.

When the user does not have a good high frequency connection to touch system ground (i.e., the user is floating), large touch areas may tend to disappear or even turn to anti-touch (i.e., a negative area in the touch image in which normal touches would be positive). This situation may lead to false positives as the normally large area of the palm is drastically reduced in size and the spacing to other unintentional touches, such as the fingers not holding a stylus, increases. To minimize false positives in these circumstances, two adjustments may be incorporated into the classification rating procedure. The first rule is that once a touch event cumulative rating passes the palm threshold, any blobs in the next frame that overlap this blob are also assigned a palm rating. This adjustment may improve performance in floating situations because portions of a palm may tend to disappear over time. While palms tend to look normal during early touchdown (and may be assigned a palm rating), as more and more of the palm touches the surface, portions of the palm tend to disappear and the remaining portions may appear to be intentional touches. However, because the remaining portions overlap the palm seen in the earlier frame(s), the remaining portions are still assigned a palm rating.

The second rule that may be used to improve performance in floating circumstances involves tracking anti-blobs in addition to normal blobs. Anti-blobs may be detected as connected components of pixels whose pixel value in the touch image is less than or equal to a negative threshold. With anti-blobs also defined in the frame data, the blob classification rating score may then be adjusted by subtracting a value from the blob classification rating score if the respective blob overlaps an anti-blob. The adjustment may be limited to those situations in which the anti-blob is large (e.g., the size of the anti-blob exceeds a threshold). Normal blobs that overlap large anti-blobs are then skewed toward a palm rating by subtracting a value from their blob classification rating. The value subtracted may either be a fixed value or a value that becomes larger for larger blob areas. Setting the threshold for a large anti-blob to a relatively large size (e.g., 50 pixels) may help avoid erroneous application of the adjustment in connection with situations involving multiple closely spaced fingers aligned on a diagonal.

The machine learning classifiers may be trained via an offline data collection stage during which a number of image sequences involving stylus, fingertip touch, and unintentional non-fingertip touch events are received. The sequences may be implemented in a wide range of possible device use scenarios and/or involving a large variety of users. Differences in pressure, gestures, orientations and other touch event characteristics may be presented. The sequences of intentional touch events (e.g., either fingertip touch, or stylus, or non-fingertip touch) are separately collected, thereby avoiding manual labeling of the touch events. The feature data set for each computed track in these sequences becomes a training example.

In RDF examples, the RDF classifier may be trained by independently training each tree of the data structure. A tree is trained one node at a time, starting from its root node. Each node is trained using an input training set. Initially, the entire training set is the input set used for training the root node.

Given an input training set T for a node n, the node is trained by sampling a certain number of times (e.g., a number corresponding with the square root of the size of the space of the split functions and their parameters) the space of split functions and their parameters. For each sampled (parameterized) split function, a number of possible threshold values (e.g., 100 thresholds) is also sampled.

For a given split combination $\Sigma=(splitF,\theta,T)$ of a split function type splitF, split function parameterization $\theta$, and threshold $\tau$, each input $x \in T$ is split according to the value of $splitF\_\theta(x)$ being below or being above or equal to the threshold T.

The training procedure identifies the split combination that achieves the maximum information gain over the split of all elements in the node's input set T over all sampled split combinations. If the gain is too small or if the node n is at the maximum preselected height (e.g., 11), then the node is set to be a leaf node and the probability of each class (e.g., fingertip touch, pen or stylus, or palm) associated with that leaf node is set to the ratio of the number of samples of that class to the total number of samples in the node's input set T. On the other hand, if the gain is sufficiently high or the height of node n is less than the maximum preselected height, the split combination $\Sigma$ achieving the maximum gain is associated to the node n, the node's input set T is split into two subsets T_L and T_R using $\Sigma$, and the node n is assigned two children nodes, a left child and a right child, each being recursively trained using input sets T_L and T_R, respectively.

A similar approach to collecting training samples may be used in training lookup table classifiers. For example, sequences of touch images are generated in a self-labeling manner. For example, each sequence only contains touches of one class (e.g., all fingers, or all palms). Blobs and the corresponding feature data are then extracted from the touch images and passed to the training procedure to be used as training samples.

In one lookup table training example, the training samples may be grouped in a number of buckets (e.g., eight) according to the height feature. For example, in touch systems in which the maximum height of any pixel in the touch image is approximately 1600, samples with heights between 0 and 199 are assigned to bucket 0, heights of 200-399 are assigned to bucket 1, and so on. To improve the generalization of the classifiers, a slight "smearing" of the samples may also be implemented. For example, a sample of height 210 may be assigned to both buckets 0 and 1. The amount of smearing is configurable and may vary, but, in one example, samples within 10% of the group boundary are assigned to both groups. The minimum and maximum values of the area and texture features are then determined for all samples within each height group. Smearing is also applied at this point so the minimum and maximum values are adjusted down/up by a small amount (e.g., 10%). The samples are then split into a number of sets (e.g., 16) according to the area feature (spread evenly between the smeared minimum/maximum for the area feature as determined above). The samples within these area buckets are then further split into a number of buckets (e.g., 16) according to the texture feature (spread evenly and smeared as before). As the samples are split by area and texture, the samples may again be smeared by approximately 10%. In examples in which the samples are smeared, unsmeared samples may be given higher priority than smeared samples. A higher priority may be provided by counting each unsmeared sample as a plurality of samples (e.g., nine), while considering each smeared sample as only a single sample.

The number of samples in each of these final buckets may then be counted. The counts are then compared to several thresholds. If the number of samples is greater than or equal to a "very likely" threshold, the classifier table value for that bucket is set to the highest classification score (e.g., three). If the number of samples is greater than or equal to a "likely" threshold, the table value is set to the next highest score (e.g., two). If the number of samples is greater than or equal to the "possible" threshold, then the table value is set to the next highest score (e.g., 1). In a two bit scoring example, the table value is otherwise set to 0. The thresholds are configurable and may vary with the number of training samples used, but, in one example, thresholds of 90, 9, and 1 for the very likely, likely, and possible thresholds, may be used, respectively. The two-bit scores are then stored in the table in accordance with the group, set and bucket divisions. The table entries thus also reflect the minimum values and bucket sizes for the area and texture features. The minimum value and bucket size for the height feature may be fixed at 0 and 200, respectively.

During classification, any values outside the table boundaries are given the lowest rating (e.g., 0) by default with the following exceptions. Blobs with a height greater than or equal to 1600 are lumped into the 1400-1599 bucket. Blobs with an area bigger than any palm area seen in training for the designated height bucket are given a palm rating of 1. These exceptions may help the classifier generalize correctly for very large blobs that were never seen in training.

Figure 2:
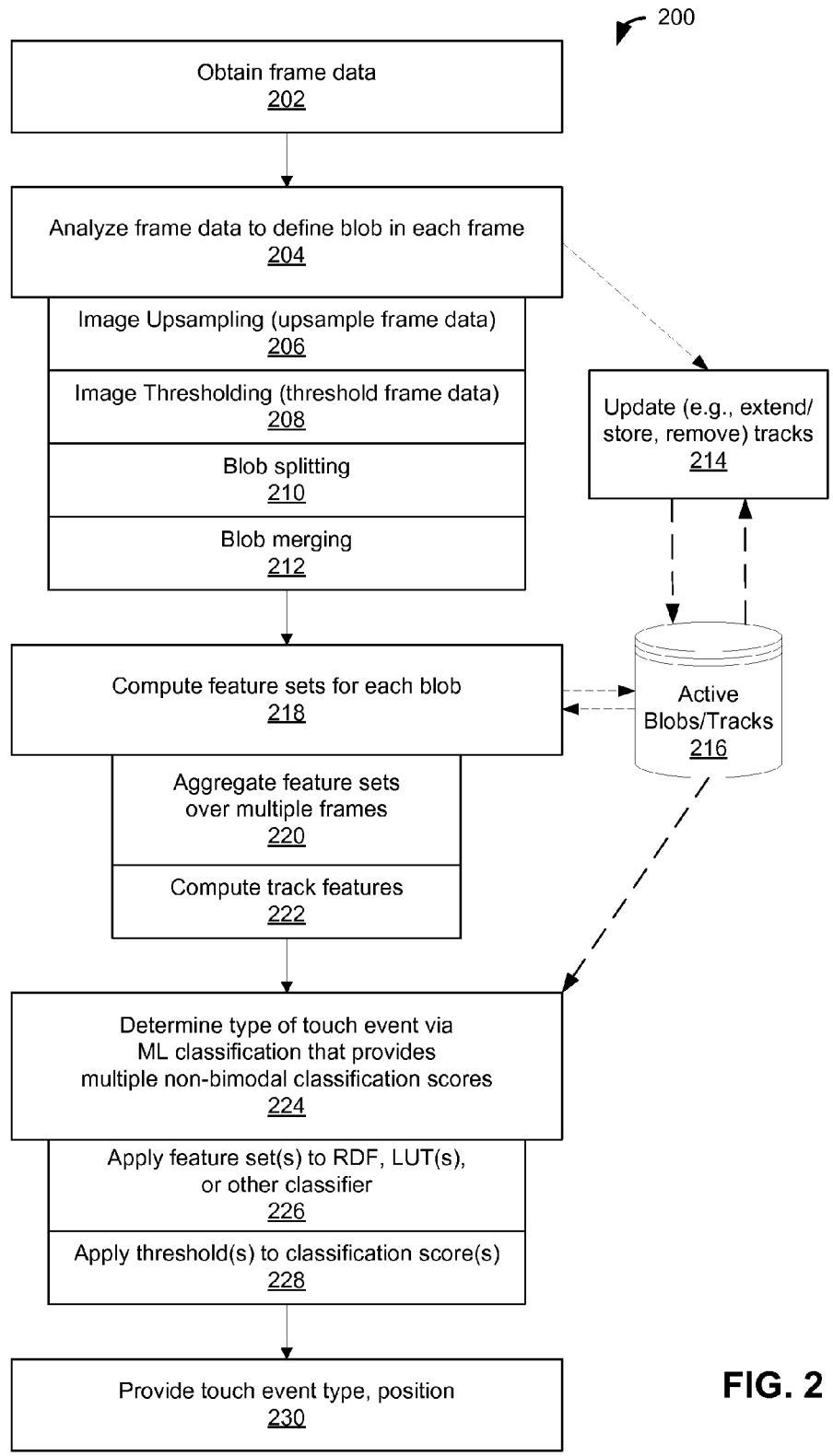
FIG. 2 is a flow diagram of a computer-implemented method for touch classification in accordance with one example.

FIG. 2 depicts an exemplary method 200 for touch classification. The method is computer-implemented. For example, one or more computers of the touch-sensitive device 100 shown in FIG. 1 and/or another touch-sensitive device may be configured to implement the method or a portion thereof. The implementation of each act may be directed by respective computer-readable instructions executed by a processor of the touch system 102, the device 100, and/or another processor or processing system. Additional, fewer, or alternative acts may be included in the method. For example, the method 200 may not include acts directed to output functionality.

The method 200 may begin with one or more acts related to capturing frame data. The manner in which the frame data is captured may vary. The frame data may be captured by a different device or processor and/or in connection with a different method implemented by the same processor or device implementing the method 200.

In the embodiment of FIG. 2, the method 200 begins with an act 202 in which the frame data is obtained. The frame data is representative of a plurality of frames (or touch sensor images) captured by the touch-sensitive device. The frame data may be received directly from the hardware or other component(s) of the touch system 102, such as the firmware 112 (FIG. 1), for processing in real time. Alternatively or additionally, the frame data may be previously captured and stored frame data. The frame data may thus be obtained by accessing a memory, such as one of the memories described in connection with FIG. 1, i.e., the memories 108, 116, and/or another memory.

In act 204, the frame data is processed to define a respective blob in each frame of the plurality of frames. The blobs are indicative of a touch event. The blobs may be tracked or associated with one another across the plurality of frames as described herein to distinguish between multiple touch events occurring in the same frame.

The analysis may include upsampling the frame data in act 206, thresholding the frame data in act 208, blob splitting in act 210, and/or blob merging in act 212. Each of these processing acts may be implemented as described above. The method 200 may include any one or more of these processing acts. For instance, in some RDF examples, the blob splitting of act 210 is implemented, but the blob merging of act 212 is not. Conversely, in some lookup table examples, the blob merging of act 212 is implemented, but the blob splitting of act 210 is not.

In some cases (e.g., some RDF examples), a track of the blobs across the plurality of frames is defined or otherwise updated for the touch event in act 214. Track definition may occur after blob definition. The blob data extracted from the current frame is processed to update the tracks identified in the previous frame. The act 214 thus defines new tracks, extends active tracks, and/or terminates active tracks. Active tracks are either extended an additional frame with a blob present in the current frame, or terminated for lack of a blob, as described above. Data indicative of the active tracks is also stored in a data store 216. The act 214 may include accessing the data store 216 as shown in connection with the processing of active tracks.

In other cases (e.g., some lookup table examples), the frame data for a particular frame is handled separately from the frame data of subsequent frames. The act 204 may be directed to analysis of the frame data of a single frame. That frame data is then prepared for further processing (e.g., feature set computation and application to a machine learning classifier) separate from the processing of frame data of subsequent frames.

In act 218, a plurality of feature sets is computed for the touch event. Each feature set specifies properties of the respective blob in each frame of the plurality of frames. The features or properties computed in act 218 may vary as described above. The number of features or properties may also vary with the complexity of the classifier. As shown in FIG. 2, in some cases, the feature set data may be stored in the data store 216 in which the active track data is stored.

In some cases (e.g., in RDF examples), the feature sets may be aggregated over the multiple frames in act 220, and track features may be computed in act 222. For instance, the acts 220 and 222 may be implemented in cases in which tracks are defined and/or the frame data for the multiple frames of a touch event is otherwise already available. The aggregation occurs before application of the plurality of feature sets to a machine learning classifier in determining the type of the touch event.

The feature set data is applied in act 224 to determine a type of the touch event via machine learning classification. The classification is configured to provide multiple non-bimodal classification scores based on the plurality of feature sets for the plurality of frames, as described above. Each non-bimodal classification score is indicative of an ambiguity or confidence level in the machine learning classification. In some cases, the data store 216 may be accessed as shown to support the classification.

In cases involving track definition and extension, the timing of the classification of act 224 may depend upon whether a track has matured (e.g., a track extended three times). In these cases, when an active track that has just been extended reaches maturity, its touch type is determined in act 224. The act 224 may thus be implemented concurrently and independently of the frame data processing and feature set computation of acts 204 and 218.

The processing of mature tracks that have already been classified, but that remain active in the current frame (e.g., as a result of extension by a blob in the current frame), may or may not rely on the previous classification. In some cases, the act 224 may be configured such that tracks that have matured in a previous frame automatically pass their touch type to the blob by which the track was extended. In other cases, the classification is of act 224 is repeated given the new aggregated feature set data (i.e., including the data contributed by the current frame).

The machine learning classification may include the application of one or more feature sets to a machine learning classifier in act 226. In some cases (e.g., some RDF examples), the feature set data for multiple frames is applied to the classifier collectively. Track feature data may also be applied in such cases. In other cases (e.g., some lookup table examples), the feature set data is applied to the classifier frame-by-frame.

After the feature set data is applied to the classifier, one or more thresholds may be applied to the classification scores in act 228. The threshold(s) may be applied to determine the touch event type and/or to determine whether processing of further frame data is warranted (e.g., if the ambiguity level is too high for the event type to be known).

The method 200 may include one or more procedures directed to providing output. In the example of FIG. 2, output data indicative of touch event type and position coordinates is provided in act 230. The coordinates may be indicative of the position of the last blob in the multiple frames associated with the touch event. Additional or alternative output data may be provided. For instance, a track ID may be provided.

In some cases, one or more of the method acts shown in FIG. 2 may be iterated or otherwise involve iteration over multiple frames. For example, in lookup table examples, feature set data is applied to the lookup table classifier iteratively for each frame. Further details regarding such iteration are described in connection with the example of FIG. 4.

The order of the acts of the method may vary from the example shown. For example, in some cases, the acts are implemented in pipeline fashion, e.g., in connection with each arriving frame. The acts may be implemented in parallel or concurrently while processing the frame data of different frames, blobs, and/or tracks. For example, the feature set computation of act 218 may be implemented concurrently with some of the machine learning classification processing of act 224.

Figures 3, 4:
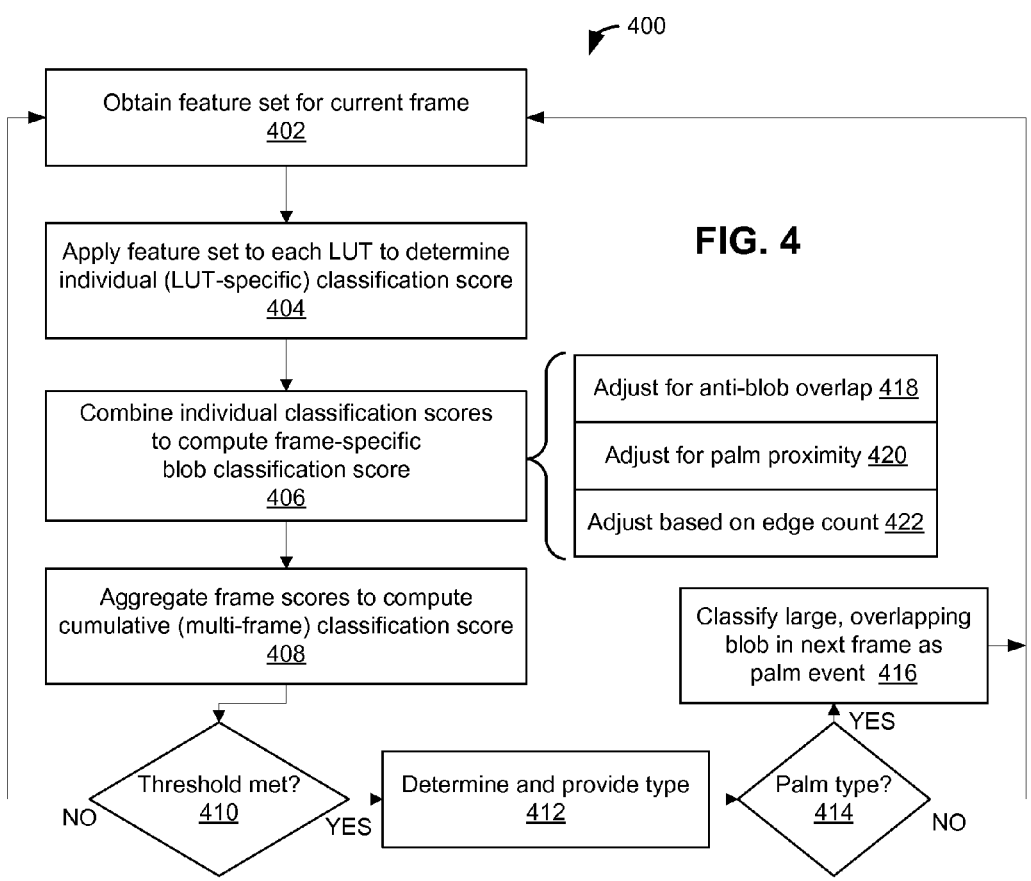
FIG. 3 is a flow diagram of a non-bimodal scoring procedure of the method of FIG. 2 in accordance with one example.
FIG. 4 is a flow diagram of a non-bimodal scoring procedure of the method of FIG. 2 in accordance with another example.

FIG. 3 shows further details regarding the touch event determination act 224 (FIG. 2) in connection with an example involving a random decision forest (RDF) classifier. In this example, the touch classification procedure begins in act 302 with obtaining an aggregated feature set for multiple frames. The aggregated feature set may be provided once blobs of the touch event have been tracked for a sufficient number of frames (i.e., a track has been extended to maturity) as described above. The aggregated feature set may also include track feature data, as described above. The aggregated feature set is then applied in act 304 to each random decision tree of the RDF classifier. The outputs of each tree are averaged in act 306 to generate multiple non-bimodal classification scores. In this case, each non-bimodal classification score is representative of a probability that the touch event is of a respective type. Thresholds may then be applied to the probability scores to determine the touch event type. One or more thresholds may be specified for each touch event type. For example, a touch event may be classified as an intended stylus touch event if the probability scores for the finger, stylus, and palm classes are below 0.3, above 0.6, and below 0.2, respectively. An output indicative of the touch event type, the track ID, and the position of the track (i.e., blob) in the current frame, may then be provided.

FIG. 4 shows further details regarding the touch event determination act 224 (FIG. 2) in connection with an example involving a lookup table (LUT) classifier. In this example, the touch classification procedure begins in act 402 with obtaining a feature set for the current frame. The feature set is then applied to multiple lookup tables in act 404. Each lookup table determines an individual (i.e., table-specific) non-bimodal classification score. For example, the multiple look-up tables may include a first look-up table configured to provide a first rating (e.g., 0 to 3) that the touch event is an intended touch and a second look-up table to determine a second rating (e.g., 0 to 3) that the touch event is an unintended touch. The individual classification scores are then combined in act 406 to compute a frame-specific classification score for the blob (i.e., the blob classification score). For example, the second rating may be subtracted from the first rating such that the blob classification score falls in a range from −3 to +3, where negative numbers are more indicative of unintended touches and positive numbers are more indicative of intended touches.

The frame-specific blob classification scores for the touch event are aggregated in act 408. The aggregation may include summing the current blob classification score with any previously computed blob classification scores for earlier frames. A cumulative (i.e., multi-frame) classification score may thus be computed.

A decision block 410 then determines whether a threshold is met for touch type classification. A respective threshold may be provided for each touch event type. For example, if the cumulative score is greater than +7, then the touch event is classified as an intended touch. If the cumulative score is less than −6, then the touch event is classified as an unintended touch. If either threshold is met, then control may pass to act 412 in which the touch event type is determined and provided as an output. If neither threshold is met, then control returns to act 402 to obtain further frame data for the next frame and iteration of the feature application act 404, the score combination act 406, and the score aggregation act 408 in connection with the further frame data.

In the example of FIG. 4, a number of acts may be implemented to adjust the classification scores or classifications in connection with several specific circumstances. A decision block 414 may be used to determine whether an adjustment should occur in a subsequent frame for a blob that overlaps a touch event deemed to be a palm touch event. In this example, if the current touch event is classified as a palm touch event, then control passes to act 416 in which a flag, state, or other variable is set to classify any overlapping blobs in the next frame as palm touch events.

Other adjustments may be implemented as adjustments to the classification scores. In the example of FIG. 4, the adjustments are implemented in connection with computing the blob classification score in act 406. An adjustment in act 418 may be directed to addressing anti-blob circumstances by subtracting a value from the blob classification score if the blob overlaps a sufficiently large anti-blob (e.g., greater than 50 pixels), as described above. Another adjustment in act 420 may be directed to addressing when a blob is close to a palm touch event by subtracting a quotient calculated by dividing a blob area of the blob by a threshold area, as described above. Yet another adjustment in act 422 may be directed to edge effects by subtracting a difference between the number of edge pixels and a threshold from the blob classification rating score, as described above.

Figure 5:
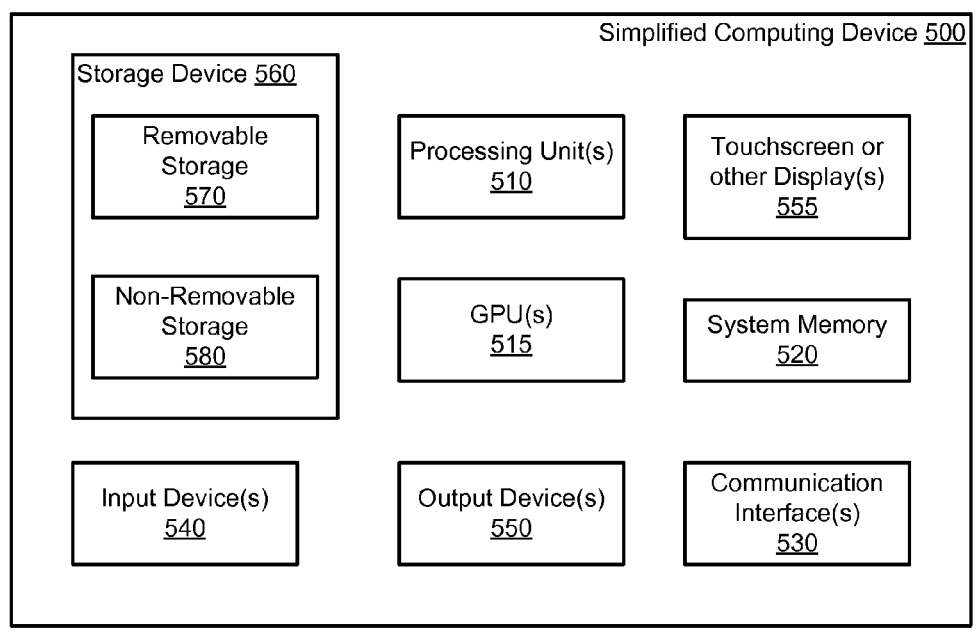
FIG. 5 is a block diagram of a computing environment in accordance with one example for implementation of the disclosed methods and systems or one or more components or aspects thereof.

With reference to FIG. 5, an exemplary computing environment 500 may be used to implement one or more aspects or elements of the above-described methods and/or systems. The computing environment 500 may be used by, incorporated into, or correspond with, the touch-sensitive device 100 (FIG. 1) or one or more elements thereof. For example, the computing environment 500 may be used to implement the touch system 102 (FIG. 1) or a host device or system in communication with the touch system 102. The computing environment 500 may be a general-purpose computer system used to implement one or more of the acts described in connection with FIGS. 2-4. The computing environment 500 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, audio or video media players, etc.

The computing environment 500 has sufficient computational capability and system memory to enable basic computational operations. In this example, the computing environment 500 includes one or more processing unit(s) 510, which may be individually or collectively referred to herein as a processor. The computing environment 500 may also include one or more graphics processing units (GPUs) 515. The processor 510 and/or the GPU 515 may include integrated memory and/or be in communication with system memory 520. The processor 510 and/or the GPU 515 may be a specialized microprocessor, such as a digital signal processor (DSP), a very long instruction word (VLIW) processor, or other microcontroller, or may be a general purpose central processing unit (CPU) having one or more processing cores. The processor 510, the GPU 515, the system memory 520, and/or any other components of the computing environment 500 may be packaged or otherwise integrated as a system on a chip (SoC), application-specific integrated circuit (ASIC), or other integrated circuit or system.

The computing environment 500 may also include other components, such as, for example, a communications interface 530. One or more computer input devices 540 (e.g., pointing devices, keyboards, audio input devices, video input devices, haptic input devices, devices for receiving wired or wireless data transmissions, etc.) may be provided. The input devices 540 may include one or more touch-sensitive surfaces, such as track pads. Various output devices 550, including touchscreen or touch-sensitive display(s) 555, may also be provided. The output devices 550 may include a variety of different audio output devices, video output devices, and/or devices for transmitting wired or wireless data transmissions.

The computing environment 500 may also include a variety of computer readable media for storage of information such as computer-readable or computer-executable instructions, data structures, program modules, or other data. Computer readable media may be any available media accessible via storage devices 560 and includes both volatile and nonvolatile media, whether in removable storage 570 and/or non-removable storage 580.

Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 500.

The touch event classification techniques described herein may be implemented in computer-executable instructions, such as program modules, being executed by the computing environment 500. Program modules include routines, programs, objects, components, data structures, etc., that perform particular tasks or implement particular abstract data types. The techniques described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

The techniques may be implemented, in part or in whole, as hardware logic circuits or components, which may or may not include a processor. The hardware logic components may be configured as Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and/or other hardware logic circuits.

The classification techniques described above may robustly differentiate between deliberate and unintended touch events in a touch sensitive device. Machine learning classifiers are used to determine whether a touch event is due to an intentional fingertip touch or an unintentional palm touch. The classifiers may also determine whether the touch event is a pen or stylus contact or touch. Some classifiers (e.g., RDF classifiers) may be configured for software implementation, e.g., at an operating system level or other level in which no hard constraints on memory availability are presented. Other classifiers may be configured for implementation in resource-limited platforms, such as microcontrollers currently used in touch processing systems. In such cases, a lookup table classifier (e.g., a 3D lookup table classifier) with a more limited set of features may be used.

In some cases, the properties or features of a touch event are computed and tracked across multiple frames before application to the classifier. After a track for the touch event reaches a predetermined number of frames (e.g., 3), the feature set may be applied to the classifier to determine multiple probability scores for the touch event. Each probability score is a non-bimodal score indicative of a probability that the touch event is of a particular type. A determination of touch type may then be determined based on the probability scores.

Other cases may involve different approaches to aggregating information for the touch event over time, as well as different types of classification scores. In some cases, a lookup-table approach is used to generate a non-bimodal classification score for each frame. The classification scores may then be aggregated (e.g., summed) over multiple frames to determine a cumulative, multi-frame classification score for the touch event.

The classification scores provided by the machine learning classifier are indicative of the likelihood that a touch was intended or unintended. The non-bimodal nature of the classification scores allows the scores to also be indicative of the level of ambiguity in the classifier determination. The determination is based on information obtained across frame boundaries and, thus, information from multiple points in time. In this manner, for example, the early frames of a palm first touching down may look like a weak "touch" classification that later turns into a strong "palm" classification as more information becomes available. Error performance may thus be improved.

The classification scores may be adjusted by one or more rules. The rules may be applied or enforced in accordance with circumstances presented by the feature set data. The circumstances may involve touch events at the edges of the frame, finger touches near a palm, and distortion of touch images caused by "floating" users. The adjustments may skew the classifier results toward or away from a palm touch or other touch type.

The technology described herein is operational with numerous other general purpose or special purpose computing system environments or configurations. Examples of well-known computing systems, environments, and/or configurations that may be suitable for use with the technology herein include, but are not limited to, personal computers, server computers (including server-client architectures), hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like. Some or all of the method or process steps and functionality may be performed by a networked or remote processor that is in communication with a client or local device being operated by a user. A potential advantage of offloading functions from a local device to a remote device is to conserve computing and power resources of the local device.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method comprising:
obtaining frame data representative of a plurality of frames captured by a touch-sensitive device;
analyzing the frame data to define a respective blob in each frame of the plurality of frames, the blobs being indicative of a touch event;
computing a plurality of feature sets for the touch event, each feature set specifying properties of the respective blob in each frame of the plurality of frames; and
determining a type of the touch event via machine learning classification configured to provide multiple non-bimodal classification scores based on the plurality of feature sets for the plurality of frames, each non-bimodal classification score being indicative of an ambiguity level in the machine learning classification.

2. The computer-implemented method of claim 1, wherein the machine learning classification is configured to generate the non-bimodal classification scores such that each non-bimodal classification score is representative of a probability that the touch event is of a respective type.

3. The computer-implemented method of claim 2, wherein each one of the non-bimodal classification scores is generated by a machine learning classifier configured to accept the plurality of feature sets as inputs.

4. The computer-implemented method of claim 3, wherein the machine learning classifier comprises a random decision forest classifier.

5. The computer-implemented method of claim 1, further comprising:
defining a track of the blobs across the plurality of frames for the touch event; and
computing a track feature set for the track,
wherein determining the type comprises applying the track feature set to a machine learning classifier.

6. The computer-implemented method of claim 1, wherein computing the plurality of feature sets comprises aggregating data indicative of the plurality of feature sets before application of the plurality of feature sets to a machine learning classifier in determining the type of the touch event.

7. The computer-implemented method of claim 1, wherein each feature set comprises data indicative of an appearance of an image patch disposed at the respective blob in each frame.

8. The computer-implemented method of claim 1, wherein each feature set comprises data indicative of an intensity gradient in the frame data for the respective blob in each frame.

9. The computer-implemented method of claim 1, wherein each feature set comprises data indicative of an isoperimetric quotient or other metric of a roundness of the respective blob in each frame.

10. The computer-implemented method of claim 1, wherein the machine learning classification comprises a lookup table-based classification.

11. The computer-implemented method of claim 1, wherein determining the type comprises applying the feature set for a respective frame of the plurality of frames to multiple look-up tables, each look-up table providing a respective individual non-bimodal classification score of the multiple non-bimodal classification scores.

12. The computer-implemented method of claim 11, wherein determining the type comprises combining each of the individual non-bimodal classification scores for the respective frame to generate a blob classification rating score for the respective frame.

13. The computer-implemented method of claim 12, wherein:
the multiple look-up tables comprise a first look-up table configured to provide a first rating that the touch event is an intended touch and further comprise a second look-up table to determine a second rating that the touch event is an unintended touch; and
determining the type comprises subtracting the second rating from the first rating to determine the blob classification rating score for the respective frame.

14. The computer-implemented method of claim 12, wherein determining the type comprises aggregating the blob classification rating scores across the plurality of frames to determine a cumulative, multi-frame classification score for the touch event.

15. The computer-implemented method of claim 14, wherein determining the type comprises:
determining whether the cumulative, multi-frame classification score passes one of multiple classification thresholds; and
if not, then iterating the feature set applying, the classification score combining, and the rating score aggregating acts in connection with a further feature set of the plurality of feature sets.

16. The computer-implemented method of claim 14, wherein determining the type further comprises, once the cumulative, multi-frame classification score exceeds passes a palm classification threshold for the touch event, classifying a further blob in a subsequent frame of the plurality of frames that overlaps the touch event as a palm touch event.

17. The computer-implemented method of claim 12, wherein combining each of the individual non-bimodal classification scores comprises adjusting the blob classification rating score by subtracting a value from the blob classification rating score if the respective blob overlaps an anti-blob.

18. The computer-implemented method of claim 12, wherein combining each of the individual non-bimodal classification scores comprises, when the blob has an area greater than a threshold area, and when the blob is within a threshold distance of a further blob having bimodal classification scores indicative of a palm, adjusting the blob classification rating score by subtracting a quotient calculated by dividing a blob area of the blob by the threshold area.

19. The computer-implemented method of claim 12, wherein combining each of the individual non-bimodal classification scores comprises:
determining if a number of edge pixels in the respective blob exceeds a threshold; and
if the threshold is exceeded, adjusting the blob classification rating score by subtracting a difference between the number of edge pixels and the threshold from the blob classification rating score.

20. A touch-sensitive device comprising:
a touch-sensitive surface;
a memory in which blob definition instructions, feature computation instructions, and machine learning classification instructions are stored; and
a processor coupled to the memory, configured to obtain frame data representative of a plurality of frames captured via the touch-sensitive surface and configured to execute the blob definition instructions to analyze the frame data to define a respective blob in each frame of the plurality of frames, the blobs being indicative of a touch event;
wherein the processor is further configured to execute the feature computation instructions to compute a plurality of feature sets for the touch event, each feature set specifying properties of the respective blob in each frame of the plurality of frames; and
wherein the processor is further configured to execute the machine learning classification instructions to determine a type of the touch event via machine learning classification configured to provide multiple non-bimodal classification scores based on the plurality of feature sets for the plurality of frames, each non-bimodal classification score being indicative of an ambiguity level in the machine learning classification.

21. The touch-sensitive device of claim 20, wherein each non-bimodal classification score is representative of a probability that the touch event is of a respective type.

22. The touch-sensitive device of claim 20, wherein:
each non-bimodal classification score is a blob classification score rating for a respective frame of the plurality of frames; and the processor is further configured to execute the machine learning classification instructions to sum the blob classification score ratings over the plurality of frames.

23. The touch-sensitive device of claim 22, wherein the processor is further configured to execute the machine learning classification instructions to combine lookup table ratings from multiple lookup tables to compute each blob classification score rating.

24. The touch-sensitive device of claim 20, wherein the processor is further configured to execute the blob definition instructions to split a connected component into multiple blobs for separate analysis.

25. The touch-sensitive device of claim 20, wherein the processor is further configured to execute the blob definition instructions to define a track for each blob of the touch event across the plurality of frames.

26. The touch-sensitive device of claim 20, wherein the processor is further configured to execute the blob definition instructions to merge multiple connected components for analysis as a single blob.

27. A touch-sensitive device comprising:
a touch-sensitive surface;
a memory in which a plurality of instruction sets are stored; and
a processor coupled to the memory and configured to execute the plurality of instruction sets,
wherein the plurality of instructions sets comprise:
first instructions to cause the processor to obtain frame data representative of a plurality of sensor images captured by the touch-sensitive device;
second instructions to cause the processor to analyze the frame data to define a respective connected component in each sensor image of the plurality of sensor images, the connected components being indicative of a touch event;
third instructions to cause the processor to compute a plurality of feature sets for the touch event, each feature set specifying properties of the respective connected component in each sensor image of the plurality of sensor images;
fourth instructions to cause the processor to determine a type of the touch event via machine learning classification configured to provide multiple non-bimodal classification scores based on the plurality of feature sets for the plurality of frames, each non-bimodal classification score being indicative of an ambiguity level in the machine learning classification; and
fifth instructions to cause the processor to provide an output to the computing system, the output being indicative of the type of the touch event;
wherein the fourth instructions comprise aggregation instructions to cause the processor to aggregate information representative of the touch event over the plurality of sensor images.

28. The touch-sensitive device of claim 27, wherein:
the fourth instructions are configured to cause the processor to apply the plurality of feature sets to a machine learning classifier; and
the aggregation instructions are configured to cause the processor to aggregate the plurality of feature sets for the plurality of sensor images before applying the plurality of feature sets.

29. The touch-sensitive device of claim 27, wherein the aggregation instructions are configured to cause the processor to aggregate the multiple non-bimodal classification scores.

* * * * *